United States Patent
Shanks et al.

(10) Patent No.: US 6,319,307 B1
(45) Date of Patent: Nov. 20, 2001

(54) COMMERCIAL AIR FILTER ASSEMBLY AND FILTER ASSEMBLY AND FILTRATION UNIT

(75) Inventors: Anthony E. Shanks; Patrick J. Monnens, both of Prior Lake; Richard R. Bahn, Loretto, all of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/476,690

(22) Filed: Dec. 30, 1999

(51) Int. Cl.[7] ............................ B01D 29/56; B01D 53/04
(52) U.S. Cl. .................... 96/135; 55/486; 55/493; 55/511; 160/391
(58) Field of Search .................... 55/486, 487, 493, 55/481, 506, 511; 96/134, 135; 160/380, 391; 422/122

(56) References Cited

U.S. PATENT DOCUMENTS

| | | | |
|---|---|---|---|
| 2,077,951 | * 4/1937 | Myers . | |
| 2,575,499 | * 11/1951 | Manow . | |
| 3,052,372 | * 9/1962 | Shepherd . | |
| 3,494,113 | * 2/1970 | Kinney . | |
| 3,568,416 | * 3/1971 | Staunton | 55/486 |
| 3,570,220 | * 3/1971 | Felter . | |
| 3,810,350 | * 5/1974 | Scholl | 55/487 |
| 3,956,458 | * 5/1976 | Anderson | 96/135 |
| 4,141,703 | * 2/1979 | Mulchi | 55/487 |
| 4,268,282 | * 5/1981 | MacKenzie | 55/471 |
| 4,523,588 | 6/1985 | Dolsky | 128/201.25 |
| 4,534,775 | 8/1985 | Frazier | 55/74 |
| 4,801,316 | * 1/1989 | Schroeder | 55/493 |
| 4,917,862 | * 4/1990 | Kraw et al. | 55/487 |
| 5,059,218 | * 10/1991 | Plck | 96/66 |
| 5,288,298 | * 2/1994 | Aston | 55/485 |
| 5,302,354 | 4/1994 | Watvedt et al. | 422/177 |
| 5,348,563 | 9/1994 | Davis | 55/385.2 |
| 5,562,286 | 10/1996 | Brinket | 273/309 |
| 5,620,505 | * 4/1997 | Koch et al. | 96/134 |
| 5,879,423 | * 3/1999 | Luka et al. | 55/482 |
| 5,942,323 | 8/1999 | England | 428/323 |
| 5,947,815 | * 9/1999 | Danforth | 55/385.2 |
| 5,961,702 | 10/1999 | Doneit | 96/381 |
| 6,030,427 | * 2/2000 | Sorice et al. | 55/493 |
| 6,152,996 | * 11/2000 | Linnersten et al. | 55/486 |
| 6,156,088 | * 12/2000 | Cardarelli | 55/486 |
| 6,241,794 | * 6/2001 | Jadran et al. | 55/490 |

OTHER PUBLICATIONS

United Air Specialties, Inc., Advertisement Brochure entitled, "Crystal–Aire Modular Air Cleaning Systems", © 1992, pp. 1–4.

\* cited by examiner

Primary Examiner—David A. Simmons
Assistant Examiner—Frank M. Lawrence
(74) Attorney, Agent, or Firm—Dicke, Billig & Czaja. P.A.

(57) ABSTRACT

A filter assembly for use with a commercial air filtration unit. The filter assembly includes a frame, a sorbent material filter, and a primary particulate filter. The frame defines an upstream portion and a downstream portion, with the upstream portion forming a lip. The sorbent material filter is coupled to the downstream portion. Conversely, the primary particulate filter is coupled to the upstream portion of the frame. In this regard, the primary particulate filter defines an inner face and an outer face. Upon assembly, the inner face is adjacent the sorbent material filter and the lip projects upstream of the outer face. During use, the lip provides a receiving surface for installation within a housing, while preventing damage to the filter materials. Further, the filter assembly can be selectively maneuvered to a partially released position relative to the housing whereby the filter assembly hangs freely from the housing, supported at the lip.

35 Claims, 7 Drawing Sheets

COMMERCIAL AIR FILTER ASSEMBLY AND FILTER ASSEMBLY AND FILTRATION UNIT

BACKGROUND OF THE INVENTION

The present invention relates to a filter assembly for use with a commercial air-purifying apparatus. More particularly, it relates to a commercial air filter assembly and associated filtration unit configured to facilitate convenient installation and replacement of the filter assembly.

In recent years, there has been a growing interest to improve environmental air conditions in homes and in commercial settings, such as offices, restaurants, taverns, bowling alleys, hospitals, laboratories, lavatories, and the like. As more information has been made available to the public concerning the hazards of indoor air pollution, there has been an increased demand for air filtration devices that can be used to effectively improve air quality.

With respect to commercial applications, a self-contained, stand-alone air cleaning or filtration unit is normally employed. Stand-alone air filtration units can assume a wide variety of forms, but generally include a housing maintaining one or more applicable filter materials and a fan or blower unit. Alternatively, the blower unit and filter can be formed as separate modules, fluidly connected by ductwork. Regardless, the filtration unit housing (for both self-contained and modular configurations) defines an inlet region, within which the filter(s) is disposed, as well as an outlet or exhaust port. Most commercial settings include a false ceiling, such that the housing is easily "hidden" above the ceiling, with only a grille or air intake opening being visible to persons within the room. During use, the fan or blower unit is operated to draw room air through the filter(s) via the inlet region. The filter material or media removes undesirable air-borne particles and/or odors, such as dust, smoke, pollen, molds, etc., from the air stream. Following interaction with the filter material, the now "cleansed" air is forced, via the blower, back into the room through the outlet. A continuous intake and supply of air preferably generates a desired air re-circulation pattern within the room.

Certain types of filter media, or combinations of different filter media, have been identified as being highly proficient in removing unwanted airborne contaminants. To this end, airborne contaminants are generally categorized as particulate (e.g., pollen, molds, bacteria, smoke, etc.) or gaseous (e.g., odor, carbon monoxide, formaldehyde, volatile organic compounds (VOCs), etc.). A particulate filter is employed to remove airborne fibers or particles, and is typically "rated" according to filtering efficiency and resistance to airflow. For example, a well-known particulate filter is a high efficiency particulate arrestance (HEPA) filter. HEPA filters are generally comprised of intertwined, small (less than 1 micron) glass fibers and have a minimum efficiency of 99.97% relative to 0.3 micron dioctyl phthalate (DOP) particles. Alternatively, the particulate filter may assume other forms (with lower efficiencies), such as cellulose, wool felt or glass fiber filters with efficiencies ranging from 30%–95% ASHREA rated dust spot efficiency. For enhanced filtration of gas molecules and odors (e.g., tobacco smoke odors, cooking odors, VOCs, etc.), a filter incorporating a sorbent material (or "sorbent material filter") is normally employed. A sorbent material filter typically includes a relatively large volume of an appropriate sorbent material, or a combination of sorbent materials. The sorbent material(s) adsorb odor-causing gases and other gaseous contaminants, thereby removing the contaminants from the air stream. As a point of reference, sorbent materials identified as being most effective in removing odors include charcoal or carbon, potassium permanganate, and zeolite. In fact, an extremely popular sorbent filter material is available under the trade name CPZ™, generally composed of 60% charcoal or carbon, 20% potassium permanganate, and 20% zeolite. By providing the sorbent material in granular form (typically stored within a rigid tray), long-term odor adsorption in commercial settings can be achieved.

With the above filtering characteristics in mind, it has been found particularly advantageous for commercial air filtration units to include a pre-filter, a primary particulate filter (e.g., HEPA filter, 95% ASHREA filter, etc.) and a sorbent material filter. The pre-filter is normally an inexpensive, low efficiency (e.g., on the order of 15% dust spot efficiency) impingement filter, such as open cell foam, employed to capture relatively large particles, thereby extending the useful life of the primary particulate filter. The primary particulate filter is positioned within the unit housing upstream of the sorbent material filter to optimize overall filtering performance. In this regard, the housing typically forms one or more slots sized to receive and maintain the filter(s).

Installation and replacement of the primary particulate filter is relatively straightforward due to the filter's construction. For example, a HEPA filter is generally formed as a continuous, relatively rigid sheet, and can be installed with relative ease.

In contrast, sorbent material filters are normally large and heavy. For most commercial applications, the sorbent material filter will include a relatively large quantity of granular sorbent material, on the order of 10–20 pounds. In fact, commercial sorbent material filters may include in excess of 50 pounds of granular sorbent material stored within a correspondingly large tray. The substantial weight associated with commercial sorbent material filters renders filter handling cumbersome at best. Especially problematic is removal of a sorbent material filter from an air filtration unit housing. As a starting point, the air filtration unit housing will, for virtually all commercial installations, be suspended above the room of interest. Thus, replacement of the sorbent material filter requires a technician to first ascend a ladder stationed below the airfiltration unit. The air intake grille and any other components located upstream of the sorbent material filter are removed and set aside. The sorbent material filter is then detached from the housing. In this regard, most commercial air filtration unit housings allow the technician to use one hand to detach the filter. Once released, the filter is no longer supported by the housing. Instead the technician must immediately and continuously support the entire filter. Unfortunately, the technician has only one free hand available for supporting the sorbent material filter, as the other hand is used to decouple the sorbent material filter from the housing. As previously described, a typical commercial sorbent material filter is normally quite heavy. As a result, the technician may experience difficulties in grasping and supporting the sorbent material filter with one hand. It is likely that the technician will inadvertently drop the sorbent material filter and/or sustain a physical injury, such as hand, neck and/or back pains.

Air-purifying devices, and in particular commercial air filtration units or modules incorporating a sorbent material filter, are extremely popular and beneficial. Certain potential drawbacks associated with filter replacement have been identified, yet remain unresolved. Therefore, a need exists for a commercial filter assembly and associated air filtration unit housing designed for convenient filter installation and replacement.

SUMMARY OF THE INVENTION

One aspect of the present invention relates to a filter assembly for use with a commercial air filtration unit. The filter assembly includes a frame, a sorbent material filter and a primary particulate filter. The frame defines an upstream portion and a downstream portion. The upstream portion forms a lip. The sorbent material filter is coupled to the downstream portion of the frame. Conversely, the primary particulate filter is coupled to the upstream portion of the frame. In this regard, the primary particulate filter defines an inner face and an outer face. Upon assembly to the frame, the inner face of the primary particulate filter is adjacent the sorbent material filter. Further, the lip projects upstream of the outer face. With this configuration, the filter assembly is easily installed to an air filtration unit housing by placing the lip into engagement with a corresponding receiving area of the housing. In one preferred embodiment, the lip is configured to facilitate engagement with a bracket provided as part of the housing. More particularly, the filter assembly is moveable from an installed position to a partially released position in which the filter assembly is swung downwardly from the housing, yet supported by the bracket. Notably, with this one preferred embodiment, the lip prevents the bracket from damaging the outer face of the primary particulate filter in the installed position.

Another aspect of the present invention relates to a commercial air filtration unit. The filtration unit includes a housing and a filter assembly. The housing defines an inlet region and an outlet. The filter assembly includes a frame, a sorbent material filter and a primary particulate filter. The frame defines an upstream portion and a downstream portion, with the upstream portion forming a lip. The sorbent material filter is coupled to the downstream portion of the frame. Conversely, the primary particulate filter is coupled to the upstream portion of the frame. In this regard, the primary particulate filter defines an inner face and an outer face. Upon assembly to the frame, the inner face is adjacent the sorbent material filter and the lip projects upstream of the outer face. With this configuration, the frame is selectively mounted to the housing at the inlet region. In one preferred embodiment, the housing includes a shelf disposed along a perimeter of the inlet region for receiving the frame in an installed position. In another preferred embodiment, the housing further includes a bracket extending from the shelf. The bracket supports the frame in a partially released position whereby the filter assembly is swung downwardly from the housing. In this partially released position, the filter assembly remains supported but freely hangs from the housing such that a technician can release and then grasp the filter assembly with two hands.

Yet another aspect of the present invention relates to a filter assembly for use with a commercial air filtration unit housing. The filtration unit housing forms an inlet region and includes a retaining device disposed along a perimeter of the inlet region. With this in mind, the filter assembly includes a frame, a sorbent material filter and a primary particulate filter. The frame defines an upstream portion and a downstream portion. The sorbent material filter is coupled to the downstream portion. The primary particulate filter is coupled to the upstream portion of the frame. Upon final assembly, the filter assembly is configured to be selectively movable relative to the housing from an installed position to a partially released position. In the installed position, the frame is assembled within the inlet region. Conversely, in the partially released position, the frame extends outwardly from the inlet region for subsequent disassembly from the housing. In this regard, the frame is configured to be supportable by the retaining device in the installed and partially released positions. In one preferred embodiment, the frame is configured to prevent the retaining device from damaging the filters in the installed position.

Yet another aspect of the present invention relates to a filter frame for maintaining a primary particulate filter and a sorbent material filter. The filter frame includes an upstream portion and a downstream portion. The upstream portion is configured to maintain a primary particulate filter such that the upstream portion encompasses a perimeter of the primary particulate filter. The downstream portion extends from the upstream portion and forms an open-ended channel configured to selectively receive a sorbent material filter.

DESCRIPTION OF THE PREFERRED EMBODIMENTS

Figure 1:
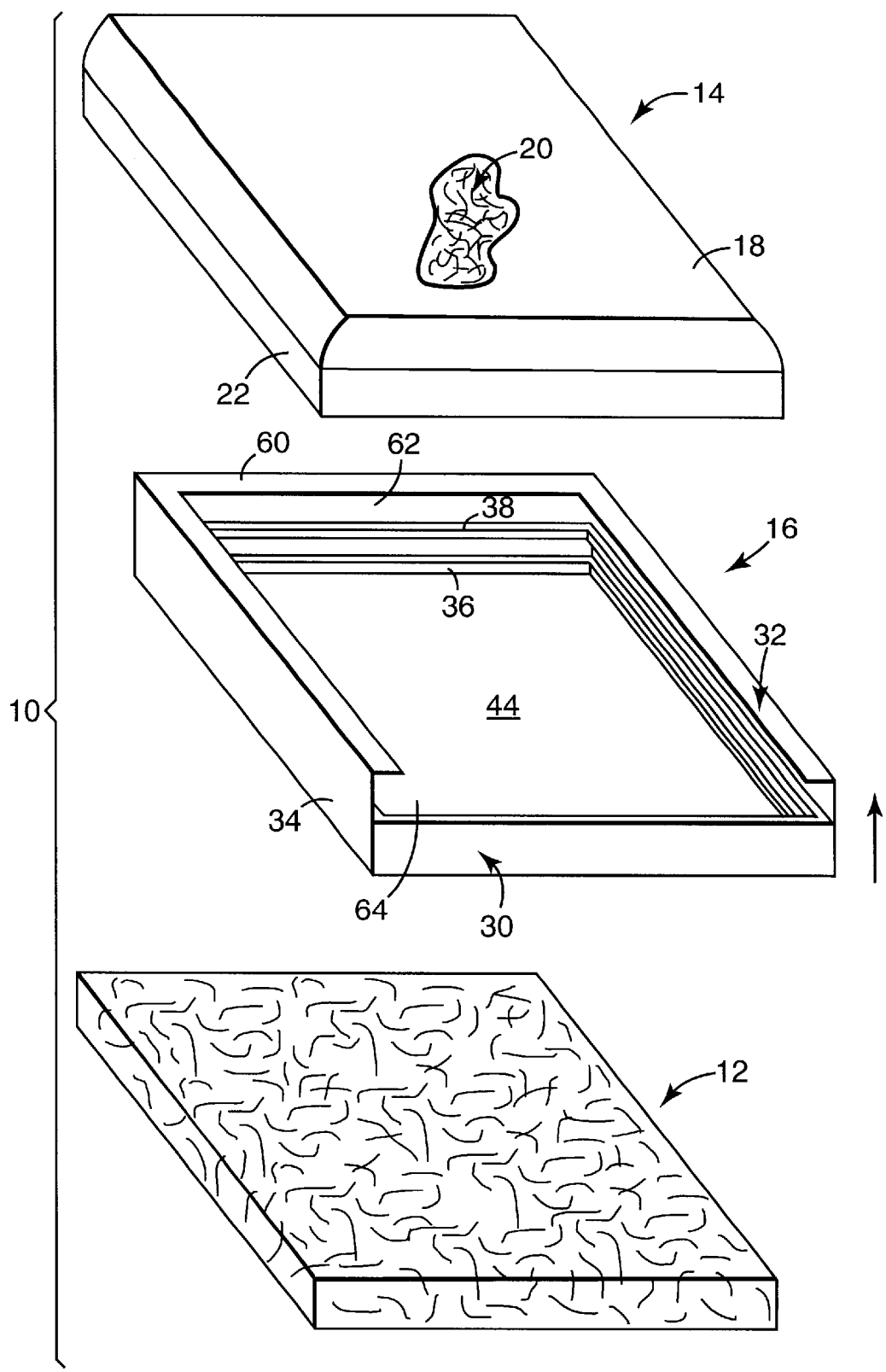
FIG. 1 is a perspective, exploded view of a filter assembly in accordance with the present invention.

One preferred embodiment of a filter assembly 10 in accordance with the present invention is shown in FIG. 1. Filter assembly 10 includes a primary particulate filter 12, a sorbent material filter 14, and a frame 16. As a point of reference, during use, airflow passes through filter assembly 10 in the general direction shown by an arrow in FIG. 1. As used throughout the specification, then, directional terminology such as "upstream" and "downstream" is made with reference to this desired airflow direction relative to filter assembly 10. With this in mind, and as described in greater detail below, primary particulate filter 12 and sorbent material filter 14 are coupled to frame 16 such that primary particulate filter 12 is upstream of sorbent material filter 14.

Primary particulate or fiber filter 12 is employed to remove relatively small air-borne contaminants (e.g., fibers or particles), such as pollen, mold spores, bacteria, etc., and is generally comprised of a mass of intertwined or impregnated fibers. A well-known example of an acceptable particulate filter is a HEPA filter. Alternatively, primary particulate filter 12 can assume other forms/structures known in the art, such as cellulose, wool felt, glass fiber, etc. filters having a 95% DOP efficiency or an efficiency ranging from 30%–95% ASHREA rated dust spot efficiency, depending upon the desired application. In one preferred embodiment, primary particulate filter 12 is a HEPA filter having a thickness of approximately 3 inches, although other dimensions are equally acceptable.

Sorbent material filter 14 is also composed of materials known in the art and provides enhanced filtering of gaseous contaminants and odors (e.g., tobacco smoke odors, cooking odors, VOCs, etc.). For long-term commercial use, sorbent material filter 14 preferably includes a relatively large volume of an appropriate sorbent material, or a combination of sorbent materials, in either granular or impregnated form. In one preferred embodiment, sorbent material filter 14 includes an encasement 18, such as a flexible bag, containing a granular sorbent material 20. Granular sorbent material 20 adsorbs gaseous contaminants and odors, thereby removing the contaminants from the air stream. Sorbent materials identified as being most effective in removing odors include charcoal or carbon, potassium permanganate, and zeolite. In fact, an extremely popular sorbent material is available under the trade name CPZ™, generally composed of 60% charcoal or carbon, 20% potassium permanganate, and 20% zeolite. In a preferred embodiment, granular sorbent material 20 is approximately 10 pounds of CPZ™, contained within flexible bag 18 having a length of approximately 25 inches and a width of approximately 21.5 inches. Alternatively, other configurations including different compositions and/or amounts of granular sorbent material 20, encasement 18, or dimensions thereof are equally acceptable. To facilitate subsequent engagement with frame 16, encasement 18 is preferably secured to a separate frame 22. With this configuration, sorbent material filter 12 preferably has an overall thickness (or height) of approximately 2–3 inches. Alternatively, other types and volumes of sorbent materials and/or configurations are equally acceptable. For example, sorbent material filter 12 can include a rigid tray maintaining a sorbent material in granular form. Even further, sorbent material filter 12 can be an impregnated sorbent material maintained by frame 22.

Figure 2:
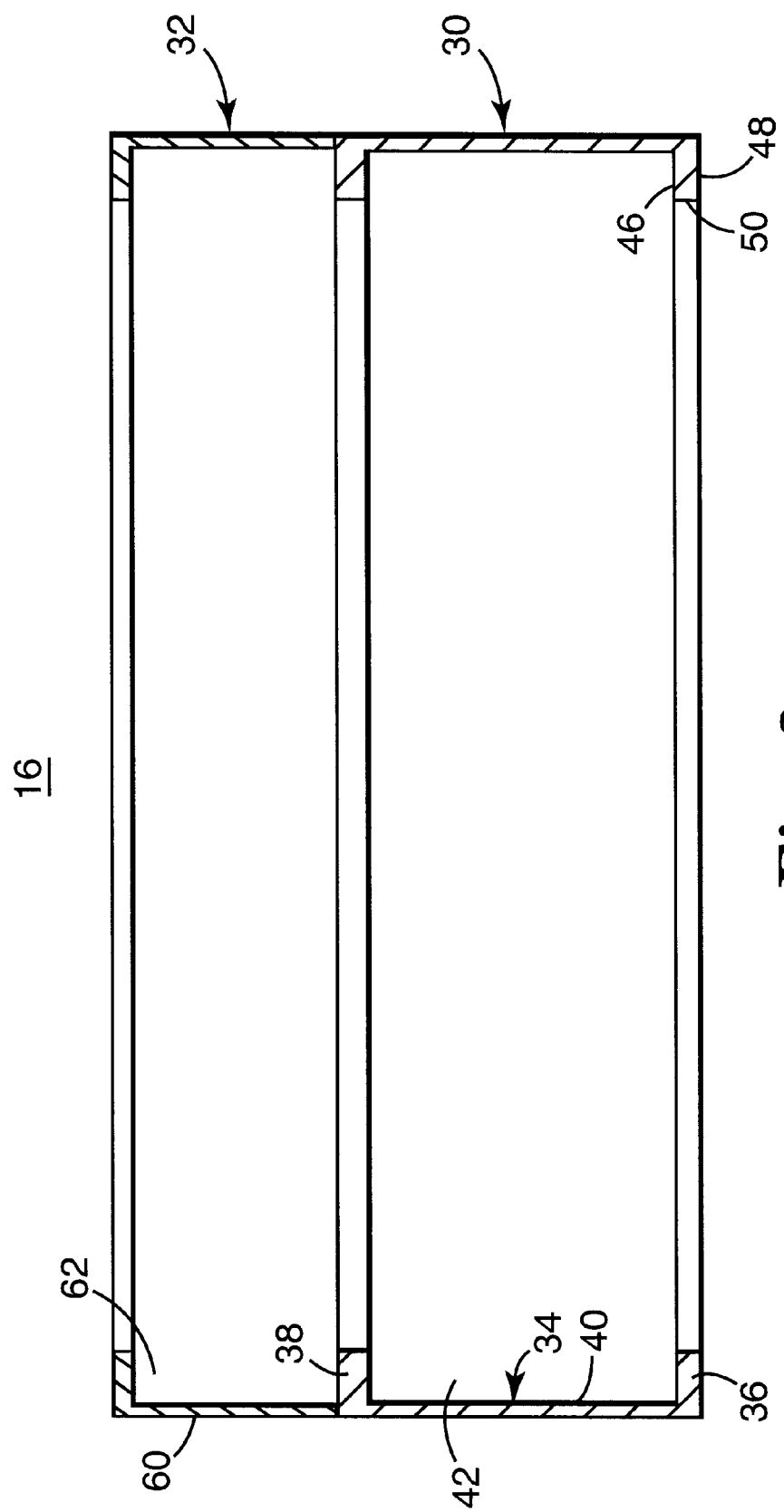
FIG. 2 is an enlarged, front cross-sectional view of a frame portion of the filter assembly of FIG. 1.

With reference to FIGS. 1 and 2, filter assembly frame 16 is generally rectangular in shape and defines an upstream portion 30 and a downstream portion 32. As described in greater detail below, upstream portion 30 is configured to maintain primary particulate filter 12. Downstream portion 32 extends from upstream portion 30 and is configured to maintain sorbent material filter 14.

Upstream portion 30 includes a side wall 34, an upstream lip 36, and a downstream lip 38. Lips 36, 38 are formed at opposite ends of side wall 34, preferably extending along an entire perimeter of side wall 34 (best shown in FIG. 1). In this regard, each of lips 36, 38 extends in a generally perpendicular fashion from an inner surface 40 of side wall 34. This configuration generates a receiving zone 42 between lips 36, 38, as best shown in FIG. 2. Receiving zone 42 is preferably sized to be slightly greater in height than a thickness of primary particulate filter 12, such that primary particulate filter 12 is securable between lips 36, 38 within receiving zone 42. Thus, in one preferred embodiment, receiving zone 42 has a height of at least approximately 3 inches, although other dimensions are equally acceptable.

Inward extension of lips 36, 38 relative to inner surface 40 preferably does not overly limit an available area for airflow through frame 16 (and thus through primary particulate filter 12). That is to say, inward extension of lips 36, 38 defines a central opening of upstream portion 30 through which air can pass. A reduction in size of opening 44 decreases a maximum airflow capacity of upstream portion 30, and thus of filter assembly 10. Conversely, however, lips 36, 38 must extend a sufficient distance to provide adequate surface area interaction with primary particulate filter 12 to retain primary particulate filter 12. With these constraints in mind, an inward extension of lips 36, 38 from inner surface 40 of side wall 34 is preferably in the range of 0.1–1.0 inch; most preferably 0.5 inch. Alternatively, however, other dimensions are equally acceptable.

In a preferred embodiment, upstream lip 36 is configured to facilitate installation of filter assembly 10 within a commercial air filtration unit housing (not shown). In this regard, upstream lip 36 defines an upper or trailing surface 46, lower or leading surface 48 and a side surface 50 (best shown in FIG. 2). Leading surface 48 is upstream of trailing surface 46 and is configured to be received by a corresponding shelf or bracket (not shown) of an air filter unit housing. Thus, leading surface 48 is preferably substantially flat. Side surface 50 extends between trailing surface 46 and leading surface 48, and defines a height of upstream lip 30. For reasons made clear below, upstream lip 36 is preferably configured to have a desired thickness or height (i.e., spacing between leading surface 48 and trailing surface 46). In one preferred embodiment, upstream lip 36 has a thickness (or height) in the range of 0.1–1.0 inch; most preferably 0.25 inch.

Downstream portion 32 extends from upstream portion 30 and is configured to maintain sorbent material filter 14. In one preferred embodiment, downstream portion 32 includes engagement walls 60 forming a channel 62. With the preferred rectangular shape of frame 16, engagement walls 60 define three sides of channel 62, with a fourth side 64 being open. Channel 62 is sized to receive and maintain sorbent material filter 14, and in particular, frame 22. In this regard, channel 62 is preferably open-ended (at fourth side 64), such that sorbent material filter 14 can slide into channel 62 for engagement with downstream portion 32. Alternatively, downstream portion 32 can assume other or additional configurations for maintaining sorbent material filter 14. For example, downstream portion may permanently capture sorbent material filter 14 and/or can include separate mechanical fasteners or materials.

Upstream portion 30 and downstream portion 32 of frame 16 are preferably integrally formed from a rigid material. For example, in one preferred embodiment, frame 16 is composed of galvanized stainless steel. Alternatively, other rigid materials, such as aluminum, plastic, etc., are equally acceptable. Frame 16 has been depicted as preferably being generally rectangular in shape. This preferred rectangular configuration corresponds with a desired configuration of an air filtration unit housing (not shown) to which filter assembly 10 is installed. Alternatively, however, other shapes can be utilized. For example, frame 16 can be square, triangular, circular, etc. Even further, frame 16 may assume an irregular shape.

Figure 3:
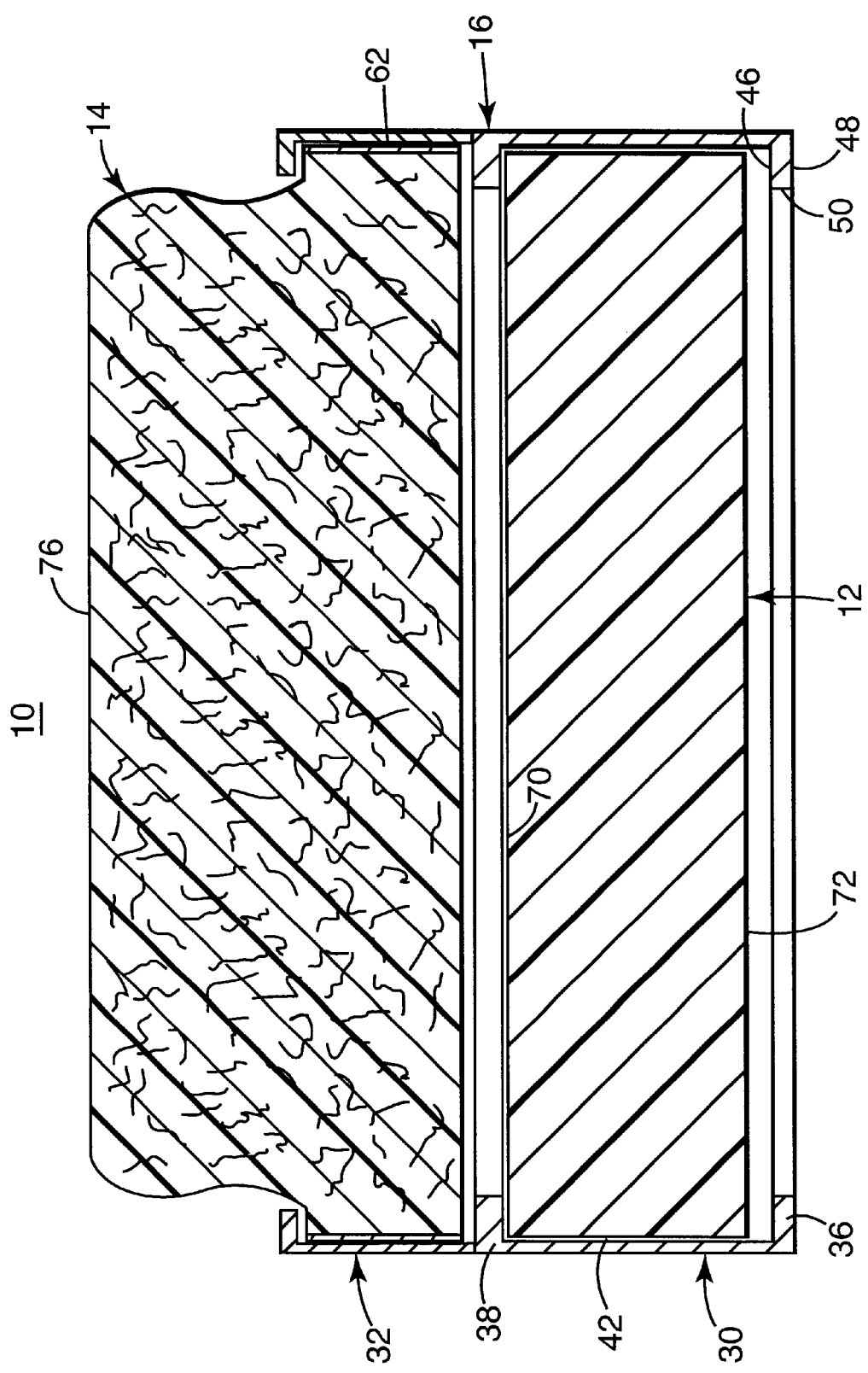
FIG. 3 is an enlarged, front cross-sectional view of the filter assembly of FIG. 1 upon final assembly.

Filter assembly 10 is shown in a final, assembled form in FIG. 3. Once again, primary particulate filter 12 and sorbent material filter 14 are coupled to frame 16. In particular, primary particulate filter 12 is secured to upstream portion 30, within receiving zone 42. In a preferred embodiment, an adhesive is used to secure primary particulate filter 12 to upstream portion 30. Sorbent material filter 14 is secured to downstream portion 32, captured within channel 62. In this regard, and with reference to FIG. 1, channel 62 is preferably open-ended such that sorbent material filter 14 can easily slide into and out of engagement with downstream portion 32.

Upon final assembly, primary particulate filter 12 defines an inner face 70 and an outer face 72. Similarly, sorbent material filter 14 defines an inner face 74 and an outer face 76. Primary particulate filter 12 is positioned upstream of sorbent material filer 14 such that inner face 70 of primary particulate filter 12 is adjacent inner face 74 of sorbent material filter 14. Conversely, outer face 72 of primary particulate filter is adjacent upstream lip 36 of frame 16. In one preferred embodiment, primary particulate filter 12 is positioned such that outer face 72 is spaced from trailing surface 46 by a distance in the range of approximately 0.1–1.0 inch, most preferably approximately 0.25 inch. This spacing, in combination with a thickness of upstream lip 36 generates an overall spacing between leading surface 48 of upstream lip 36 and outer face 72 of primary particulate filter 12 in the range of 0.3–1.5 inch; most preferably approximately 0.5 inch.

Figure 4:
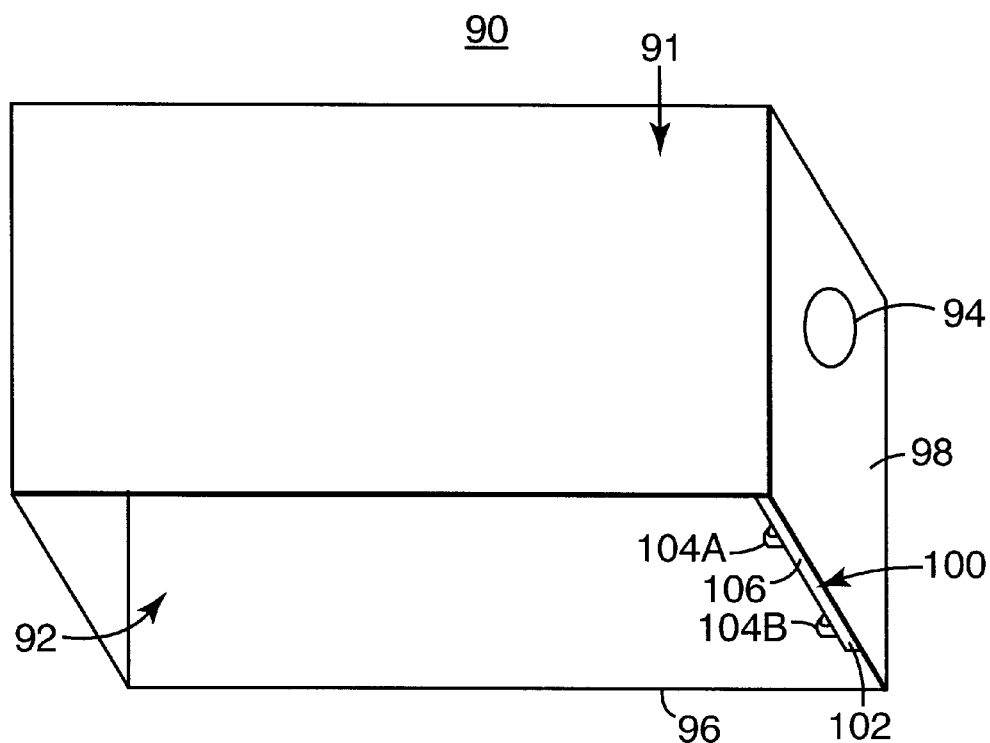
FIG. 4 is a bottom, perspective view of a commercial air filtration unit housing in accordance with the present invention.

Filter assembly 10 as described above is configured for use with a commercial air filtration unit 90, an example of which is depicted generally in FIG. 4. Air filtration unit 90 is preferably a filter module configured for fluid connection to a separate blower module (not shown). Alternatively, air filtration unit 90 can be a self-contained, stand alone commercial air-purifying device. Regardless, air filtration unit 90 includes a housing 91. Housing 91 can assume a wide variety of shapes and sizes, and is preferably made of a rigid material such as stainless steel or aluminum. Housing 91 is sized to receive and maintain filter assembly 10 and defines an inlet region 92 and an outlet 94. Inlet region 92 extends from a lower edge 96 and extends internally within housing 91. In one preferred embodiment, outlet 94 is formed along a side wall 98 of housing 91. Notably, housing 91 can be formed to provide two or more outlets 94. Depending upon a desired end use of air filtration 90, housing 91 can be configured to maintain additional components. For example, where air filtration unit 90 is a stand alone device, housing 91 maintains a blower unit or fans (not shown). In a preferred embodiment, however, housing 91 maintains filter assembly 10 and is fluidly connected to a separate blower module via outlet 94. With this configuration, airflow enters housing 91 at inlet region 92 and exits housing 91 at outlet 94.

In a preferred embodiment, air filtration unit 90 further includes a retaining device 100 configured to receive and maintain filter assembly 10 (FIG. 1). Retaining device 100 is secured to housing 91 along a perimeter of inlet region 92, preferably spaced from lower edge 96. In a preferred embodiment, retaining device 100 includes an elongated support piece 102 and brackets 104A, 104B. Elongated support piece 102 is preferably an L-shaped member, providing a shelf 106. As described in greater detail below, shelf 106 is sized to receive and maintain filter assembly 10 (FIG. 1). With this in mind, shelf 106 has a width (or extension from side wall 91) in the range of 0.5–2 inches; most preferably 0.85 inch. Further, shelf 106 preferably has a length of approximately 22 inches. Alternatively, however, other dimensions are equally acceptable. Brackets 104A, 104B are each preferably spaced from respective ends of elongated support piece 102 by approximately 3 inches.

Figure 5:
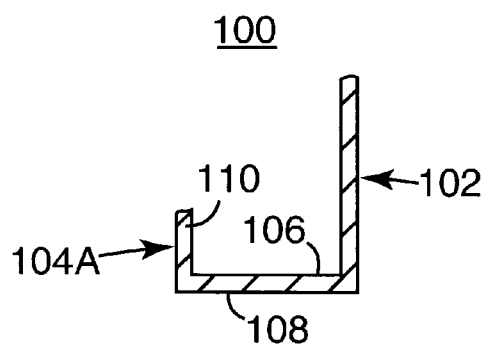
FIG. 5 is an enlarged, side cross-sectional view of a retaining device associated with the housing of FIG. 4.

Retaining device 100, and in particular bracket 104A, is shown in greater detail in FIG. 5. While not shown, bracket 104B is preferably identical in form. Bracket 104A includes a base section 108 and a shoulder 110. Base section 108 extends from shelf 106 in a plane substantially parallel to that of shelf 106. Shoulder 110 extends generally upwardly (or in a downstream direction) from base section 108, preferably forming a right angle with base section 108. With this configuration, shoulder 110 is substantially perpendicular to shelf 106. As described below, brackets 104A, 104B support filter assembly 10 (FIG. 1) during removal from housing 91 (FIG. 4). Base section 108 preferably has a length in the range of approximately 0.1–1.0 inch, most preferably 0.35 inch. Shoulder 110 preferably has a height (or downstream extension) in the range of 0.1–0.5 inch; most preferably 0.25 inch.

Returning to FIG. 4, retaining device 100, including elongated support piece 102 and brackets 104A, 104B, is preferably integrally formed from a rigid material. In one preferred embodiment, retaining device 100 is 20 gage galvanized steel. Alternatively, other rigid materials and thickness may also be useful. While retaining device 100 has been preferably described as including two of brackets 104A, 104B, other numbers, either greater or lesser, are equally acceptable. Further, brackets 104A, 104B may be formed such that shoulder 110 extends directly from shelf 106, thereby eliminating base section 108.

Figure 6A:
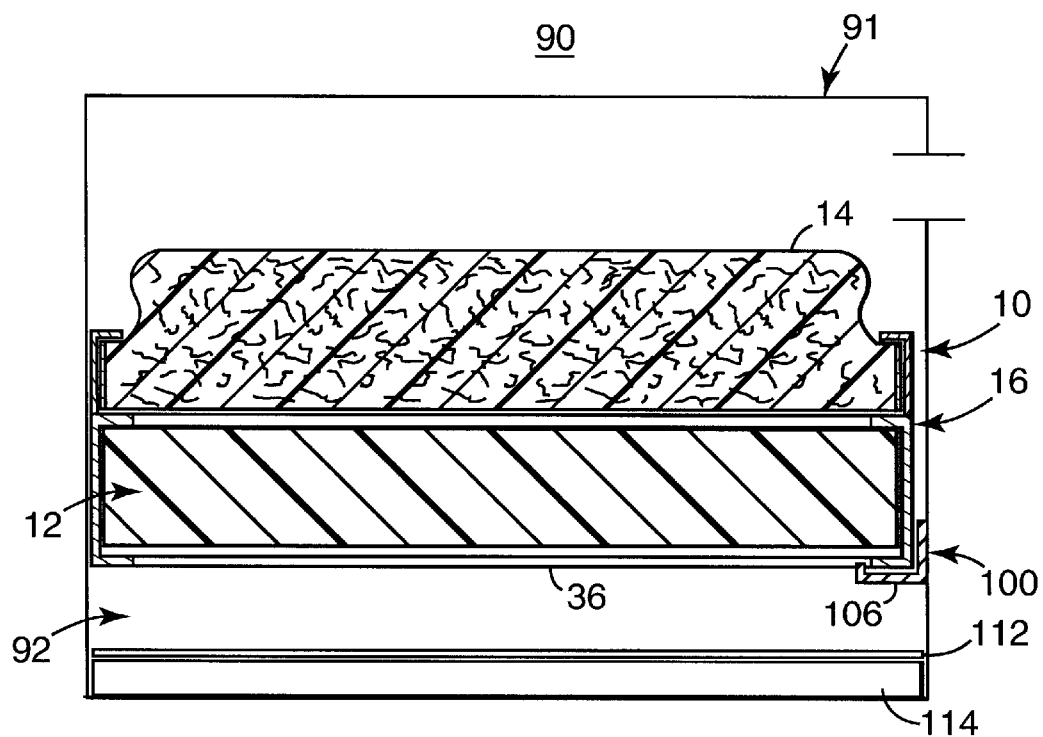
FIG. 6A is a front, cross-sectional view of the filter assembly of FIG. 1 installed to the housing of FIG. 4.

Air filtration unit 90 is depicted with filter assembly 10 installed within housing 91 in FIG. 6A. Filter assembly 10 is disposed within housing 91 so as to substantially encompass a cross-sectional area of inlet region 92. With this configuration, airflow enters air filtration unit 90 at inlet region 92 and is directed through filter assembly 10 for removal of airborne contaminants. As a point of reference, air filtration unit 90 may include additional components, such as a pre-filter 112 and an inlet grille 114. Pre-filter 112 can assume a wide variety of forms and is preferably configured to capture relatively large air-borne particles. For example, pre-filter 112 can be a lightweight impingement filter, having a thickness of approximately 1-inch. Other known materials, such as aluminum mesh screens, reinforced cotton fibers, synthetic materials, etc., able to trap relatively large particles, such as dust and pet hairs, are equally acceptable. Inlet grille 114 is similarly well-known in the art, preferably an egg crate grille formed from hardened plastic. Alternatively, other relatively rigid materials are equally acceptable, such as aluminum. Grille 114 is provided to capture large, air-borne fibers as well as to render air filtration unit 90 aesthetically pleasing. In this regard, upon final assembly and installation of air filtration unit 90 above a false ceiling, inlet grille 114 will be the only component viewable by a room occupant.

Where provided, pre-filter 112 and inlet grille 114 are preferably configured to be selectively detachable from housing 91. For example, inlet grille 114 is hingedly secured to housing 91, with pre-filter 112 preferably nesting on top of inlet grille 114. With this configuration, pre-filter 112 and inlet grille 114 can be rotated downwardly from housing 91 to provided access to filter assembly 10.

Figure 6B:
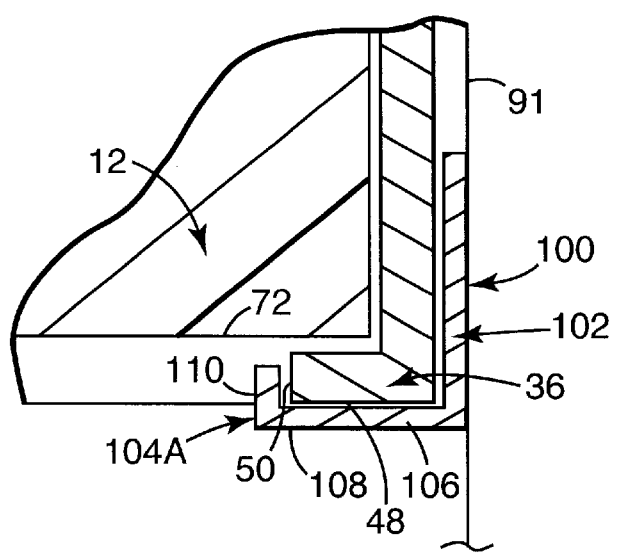
FIG. 6B is an enlarged view of a portion of FIG. 6A.

Filter assembly 10 is supported in the installed position of FIG. 6A by retaining device 100, whereby upstream lip 36 rests on shelf 106. Preferably, a substantial seal is created between upstream lip 36 and shelf 106 to maximize airflow through filters 12, 14. In a preferred embodiment, a side of filter assembly 10 opposite retaining device 100 is coupled to housing 91 by a separate device, such as a hook (not shown) extending from frame 16. The hook is secured to a loop formed to housing 91. Alternatively, other coupling techniques can be employed. A relationship between upstream lip 36 and retaining device 100 in the installed position is shown in greater detail in FIG. 6B. Once again, in the installed position, leading surface 48 of upstream lip 36 nests on top of shelf 106. Extension of base section 108 of bracket 104A is such that shoulder 110 clears upstream lip 36. That is to say, upstream lip 36 is positioned between shoulder 110 and housing 91, with shoulder 110 projecting substantially parallel to side surface 50 of upstream lip 36. Importantly, a height of shoulder 110 is less than a spacing between leading surface 48 of upstream lip 36 and outer face 72 of primary particulate filter 12, as previously described.

For example, in one preferred embodiment, outer face 72 is spaced from leading surface 48 by approximately 0.5 inch, whereas shoulder 110 has a height of approximately 0.25 inch. With this preferred relationship, in the installed position, shoulder 110 is spaced from, and therefore will not contact or otherwise damage, outer face 72 of primary particulate filter 12.

Figure 7A:
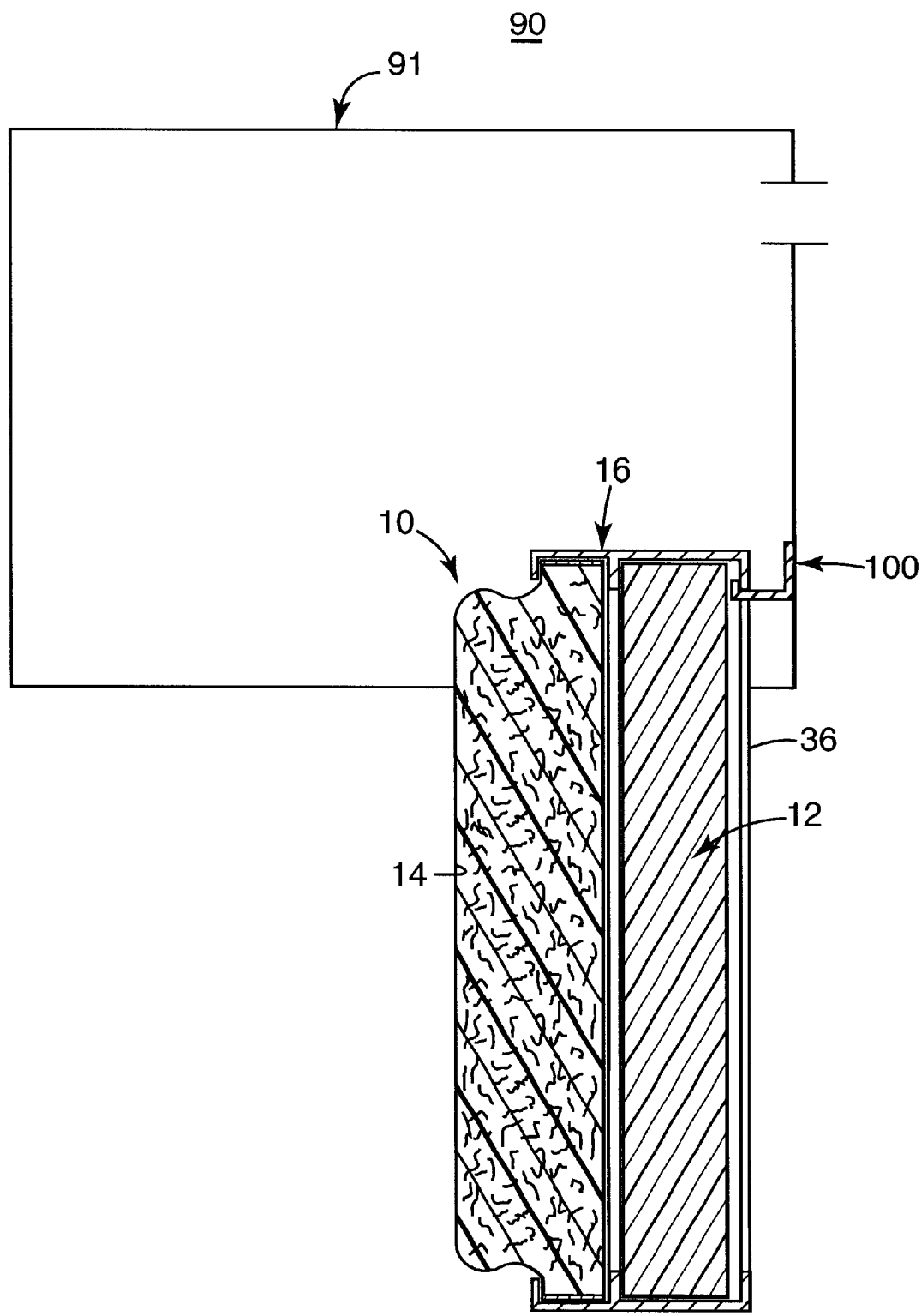
FIG. 7A is a front, cross-sectional view of the filter assembly of FIG. 1 partially released from the housing of FIG. 4.
Figure 7B:
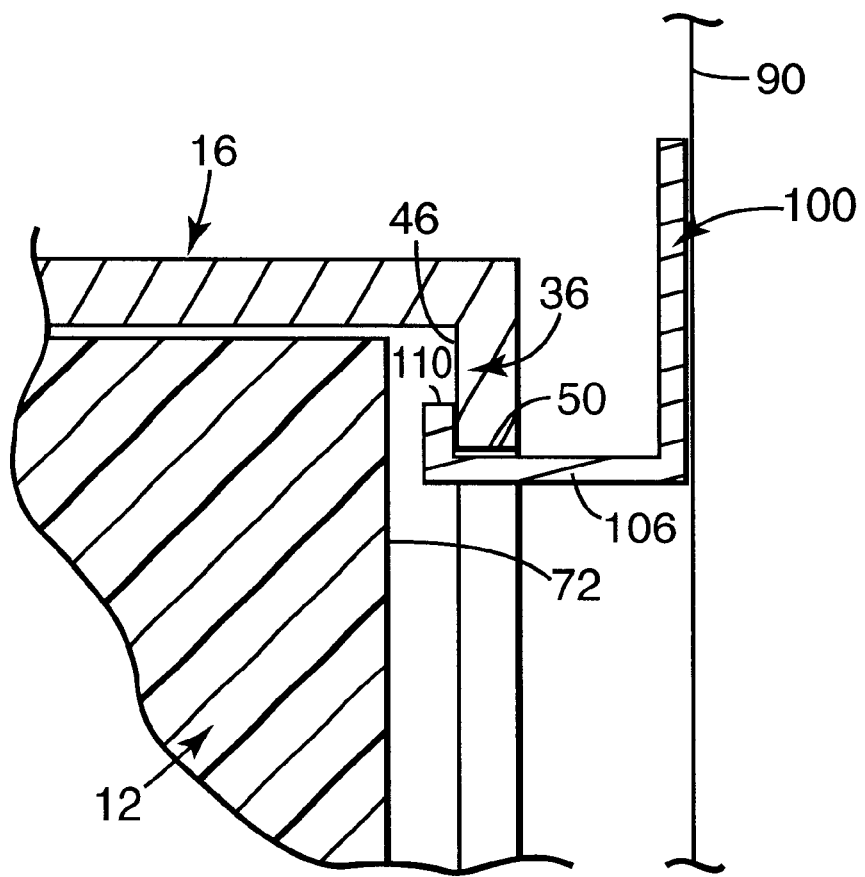
FIG. 7B is an enlarged view of a portion of FIG. 7A.

Over time, primary particulate filter 12 and/or sorbent material filter 14 may become "saturated" with contaminants, requiring removal and replacement. Returning to FIG. 6A, inlet grille 114 and pre-filter 112 (where provided) are first partially or entirely removed from housing 91 to provide access to filter assembly 10. Filter assembly 10 is then maneuvered from the installed position of FIG. 6A to a partially released position depicted in FIG. 7A. In particular, the coupling device connecting frame 16 to housing 91 opposite retaining device 100 (previously described as preferably being a hook and loop) is disassembled by a technician (not shown), and filter assembly 10 allowed to pivot or rotate downwardly along retaining device 100. In the partially released position, upstream lip 36 remains supported by retaining device 100. Importantly, filter assembly 10 essentially hangs "freely" from retaining device 100, being captured by brackets 104A, 104B. As shown in greater detail in FIG. 7B, shoulder 110 extends between trailing surface 46 of upstream lip 36 and outer face 72 of primary particulate filter 12. Trailing surface 46 of upstream lip 46 contacts and is supported by shoulder 110; whereas (in the partially released position) side surface 50 contacts and is supported by shelf 106. Thus, shelf 106 supports filter assembly while brackets 104A, 104B prevent filter assembly 10 from moving laterally (left in FIG. 7B). In the partially released position, the technician is afforded the ability to completely release or let go of filter assembly 10 and reposition himself/herself. The technician is not required to continually support the filter assembly 10 with one or both hands. Subsequently, the technician can use both hands to grasp filter assembly 10 and completely remove filter assembly 10 from housing 91.

The filter assembly and associated air filtration unit of the present invention provides a marked improvement over previous designs. By providing the filter assembly frame with a lip projecting upstream of the filter media, a complete surface is formed for assembly to the air filtration unit housing. Further, by configuring the lip extension in conjunction with an associated retaining device, filter material damage can be avoided upon final installation. The retaining device, in turn, can be desirably designed to facilitate convenient removal of the filter assembly from the air filtration unit housing. In this regard, a combination of the retaining device and filter assembly design allows the filter assembly to "freely" hang from the air filtration unit housing, in a partially released position, thereby allowing a technician to use two hands for safe filter assembly removal. This is in direct contrast to prior art commercial sorbent material air filters, the replacement of which required the technician to constantly have one hand supporting the entire filter weight.

Although the present invention has been described with reference to preferred embodiments, workers skilled in the art will recognize that changes may be made in form and detail without departing from the spirit and scope of the present invention. For example, the filter module has been preferably described as being part of an air-purifying system including a separate blower module. Alternatively, the filter module can be a stand alone, self-contained unit incorporating a blower unit or fan. Further, the filter assembly may include component materials in addition to the sorbent material filter and the primary particulate filter.

What is claimed is:

1. A filter assembly for use with a commercial air filtration unit, said filter assembly comprising:
   a frame defining an upstream portion and a downstream portion, said upstream portion forming an upstream lip, and said upstream lip defining a trailing surface;
   a sorbent material filter selectively coupled to said downstream portion; and
   a primary particulate filter defining an inner face and an outer face, said primary particulate filter being coupled to said upstream portion such that said inner face is adjacent said sorbent material filter and said upstream lip projects upstream of said outer face creating an unobstructed space between said trailing surface and said outer face.

2. The filter assembly of claim 1, wherein said upstream lip terminates in a leading surface configured for selective mounting to a housing.

3. The filter assembly of claim 2, wherein a spacing of said trailing surface relative to said outer face corresponds with a dimension of a retaining device associated with a housing.

4. The filter assembly of claim 2, wherein a spacing between said trailing surface and said outer face is at least approximately 0.3 inch.

5. The filter assembly of claim 4, wherein said spacing is approximately 0.5 inch.

6. The filter assembly of claim 2, wherein said trailing surface is substantially flat, extending in a plane substantially parallel with a plane of said outer face.

7. The filter assembly of claim 6, wherein said trailing surface has a width in the range of approximately 0.2–1.0 inch.

8. The filter assembly of claim 2, wherein said upstream lip extends along a perimeter of said frame for sealing with a filter housing.

9. The filter assembly of claim 1, wherein said upstream portion forms a channel for selectively receiving said sorbent material filter.

10. The filter assembly of claim 1, wherein said frame is substantially rectangular, having a length in the range of approximately 20–25 inch and a width in the range of approximately 20–25 inch.

11. The filter assembly of claim 1, wherein said primary particulate filter is a HEPA filter.

12. The filter assembly of claim 1, wherein said sorbent material filter includes an encasement containing a granular sorbent material.

13. The filter assembly of claim 12, wherein said granular sorbent material includes a material selected from the group consisting of carbon, potassium permanganate and zeolite.

14. The filter assembly of claim 12, wherein said sorbent material includes at least 10 pounds of said granular sorbent material.

15. The filter assembly of claim 1, further comprising a downstream lip attached to said housing to further divide said upstream portion and said downstream portion, wherein said primary particulate filter is coupled to said downstream lip.

16. A commercial air filtration unit comprising:
   a housing defining an inlet region and an outlet, said inlet region supporting a shelf along a portion of the perimeter of said inlet region; and
   a filter assembly comprising:

a frame defining an upstream portion and a downstream portion, said upstream portion forming an upstream lip, and said upstream lip defining a trailing surface, a sorbent material filter selectively coupled to said downstream portion, and a primary particulate filter defining an inner face and an outer face, said primary particulate filter being coupled to said upstream portion such that said inner face is adjacent said sorbent material filter and said upstream lip projects upstream of said outer face, creating an unobstructed space between said trailing surface and said outer face;

wherein said upstream lip is selectively coupled to said shelf.

17. The air filtration unit of claim 16, further comprising a downstream lip associated to said frame to further divide said upstream portion and said downstream portion, wherein said primary particulate filter is coupled to said downstream lip.

18. The air filtration unit of claim 16, wherein said upstream lip forms a substantial seal with said shelf upon final assembly.

19. The air filtration unit of claim 16, further comprising a bracket extending from said shelf, said bracket including a shoulder projecting substantially perpendicular to said shelf.

20. The air filtration unit of claim 19, wherein said spacing of said trailing surface relative to said outer face is greater than a height of said shoulder such that said shoulder does not damage said outer face upon final assembly.

21. The air filtration unit of claim 20, wherein said spacing is approximately 0.5 inch.

22. The air filtration unit of claim 21, wherein said height is approximately 0.25 inch.

23. The air filtration unit of claim 19, wherein said filter assembly is selectively moveable from an installed position in which said filter assembly is assembled within said housing to a partially released position in which said filter assembly extends outwardly from said housing for subsequent disassembly from said housing, and further wherein said bracket is configured to support said filter assembly in said partially released position.

24. The air filtration unit of claim 23, wherein said filter assembly is configured such that said shoulder extends between said upstream lip and said outer face in said partially released position.

25. The filter module of claim 16, wherein said primary particulate filter is a HEPA filter.

26. The filter module of claim 16, wherein sorbent material filter includes an encasement containing a granular sorbent material.

27. The filter module of claim 26, wherein said granular sorbent material includes a material selected from the group consisting of carbon, potassium permanganate, and zeolite.

28. The filter module of claim 26, wherein said sorbent material filter includes at least 10 pounds of said granular sorbent material.

29. A filter assembly for use with a commercial air filtration unit housing forming an inlet region and including a retaining shelf disposed along a perimeter of said inlet region, said filter assembly comprising:

a frame defining an upstream portion and a downstream portion, said upstream portion forming an upstream lip, and said upstream lip defining a trailing surface;

a sorbent material filter selectively coupled to said downstream portion; and a primary particulate filter defining an inner face and an outer face, said primary particulate filter coupled to said upstream portion;

wherein said upstream lip is positioned to create an unobstructed space between said trailing surface and said outer face, further wherein said filter assembly is configured to be selectively moveable relative to said housing from an installed position in which said frame is assembled within said inlet region, to a partially released position in which said frame extends outwardly from said inlet region for subsequent disassembly from said housing, and further wherein said frame is configured to be supportable by said retaining shelf in said installed and partially released positions.

30. The filter assembly of claim 29, wherein said retaining shelf includes a shoulder for supporting said frame in said partially released position, and further wherein said frame is configured to prevent said filters from being damaged by said shoulder in said installed position.

31. The filter assembly of claim 30, wherein in said installed position, an outer face of said primary particulate filter is adjacent said shoulder, said frame being configured to provide clearance between said shoulder and said outer face in said installed position.

32. The filter assembly of claim 31, wherein said filter assembly is configured to allow insertion of said shoulder between said outer face and said frame in said partially released position.

33. A filter comprising:

a primary particulate filter; and a sorbent material filter; and a frame comprising;
   an upstream portion configured to maintain said primary particulate filter such that said upstream portion encompasses a perimeter of said primary particulate filter; and
   a downstream portion extending from said upstream portion, said downstream portion forming an open-end channel configured to selectively receive said sorbent material filter; and a downstream lip dividing said upstream portion and said downstream portion.

34. The filter of claim 33, wherein said upstream portion forms an upstream lip.

35. The filter of claim 33, wherein said downstream portion is configured to slidably receive a sorbent material filter.

* * * * *